(12) United States Patent
Blaya et al.

(10) Patent No.: US 11,782,961 B2
(45) Date of Patent: Oct. 10, 2023

(54) DEVICE, SYSTEM AND METHOD FOR PROVIDING DESCRIPTIONS TO COMMUNICATION DEVICES USING MACHINE LEARNING GENERATED TEMPLATES

(71) Applicant: AMADEUS S.A.S., Biot (FR)

(72) Inventors: Christophe Blaya, La Roquette sur Siagne (FR); Xavier Callens, Cagnes sur Mer (FR); Ilias Driouich, Nice (FR); Bernard Jean Marie Rannou, Le Cannet (FR); Yazid Goghrod, Nice (FR); Ranganath Vaikuntham, Nice (FR); Benoit Lacoue, Peymeinade (FR)

(73) Assignee: AMADEUS S.A.S., Biot (FR)

( * ) Notice: Subject to any disclaimer, the term of this patent is extended or adjusted under 35 U.S.C. 154(b) by 79 days.

(21) Appl. No.: 17/232,714

(22) Filed: Apr. 16, 2021

(65) Prior Publication Data
US 2022/0335072 A1 Oct. 20, 2022

(51) Int. Cl.
| | |
|---|---|
| G06F 16/332 | (2019.01) |
| G06N 20/00 | (2019.01) |
| G06F 16/335 | (2019.01) |
| G06F 40/205 | (2020.01) |
| G06F 40/51 | (2020.01) |
| G06F 18/214 | (2023.01) |
| G06F 18/2113 | (2023.01) |

(52) U.S. Cl.
CPC ........ *G06F 16/3326* (2019.01); *G06F 16/335* (2019.01); *G06F 16/3329* (2019.01); *G06F 18/214* (2023.01); *G06F 18/2113* (2023.01); *G06F 40/205* (2020.01); *G06F 40/51* (2020.01); *G06N 20/00* (2019.01)

(58) Field of Classification Search
CPC ............. G06F 16/3326; G06F 16/3329; G06F 16/335; G06F 40/205; G06F 40/51; G06N 20/00; G06K 9/623; G06K 9/6256
USPC ........................................................ 707/749
See application file for complete search history.

(56) References Cited

U.S. PATENT DOCUMENTS

| | | | |
|---|---|---|---|
| 9,436,747 B1* | 9/2016 | Baker | .................. G06F 40/186 |
| 2007/0192309 A1* | 8/2007 | Fischer | ............... G06F 16/3344 |
| | | | 707/999.005 |

(Continued)

*Primary Examiner* — Hosain T Alam
*Assistant Examiner* — Saba Ahmed
(74) *Attorney, Agent, or Firm* — PERRY + CURRIER, INC.

(57) ABSTRACT

A device, system and method for providing descriptions to communication devices using machine learning generated templates is provided. A device replaces given word types in provided text files with corresponding tags to generate corresponding intermediate templates, the provided text files associated with a given topic. The device generates, for the given topic, one or more textual templates that include at least a portion of the corresponding tags, the textual templates in natural language sentences, the generating of the textual templates at least partially based on the corresponding intermediate templates. The device populate the corresponding tags in a textual template, of the textual templates, with corresponding words of a given data file associated with the given topic, to generate a respective description of a given item associated with the given topic, the given data file being specific to the given item. The device provides the respective description to a communication device

16 Claims, 7 Drawing Sheets

(56) References Cited

U.S. PATENT DOCUMENTS

| | | | |
|---|---|---|---|
| 2009/0077180 A1* | 3/2009 | Flowers | G06F 16/3329 |
| | | | 709/206 |
| 2011/0213655 A1* | 9/2011 | Henkin | G06Q 30/00 |
| | | | 707/E17.061 |
| 2015/0356136 A1* | 12/2015 | Joshi | G06F 16/29 |
| | | | 707/769 |
| 2016/0098405 A1* | 4/2016 | Gorbansky | G06F 16/93 |
| | | | 707/749 |
| 2016/0299992 A1* | 10/2016 | Cetintas | G06F 16/951 |
| 2017/0213469 A1 | 7/2017 | Elchik et al. | |
| 2018/0159888 A1* | 6/2018 | Irimie | G06F 30/20 |
| 2018/0329987 A1 | 11/2018 | Tata et al. | |

\* cited by examiner

```
<listing>
  <id>abc123</id>
  <name>BIG LOUD HOTEL</name>
  <address>
    <component name="addr1">1234 Ibiza Road</component>
    <component name="city">Ibiza</component>
   </address>
  <country>Spain</country>
  <category>Family</category>
  <Content>The hotel includes a pool</Content>
  <Content>The hotel is on a beach</Content>
  <Content>The hotel is a 10 minute drive from Ibiza Airport</Content>
</listing>
```
— 110

+

<HotelName> is only <TimedDrivingDistance> from <Airport>. The hotel is perfect for families and includes <LeisureAmenity> and <LeisureAmenity>. Business travelers may take advantage of our <WifiType>, and <BusinessAmenity>  — 404-M

⇓ 104-3

BIG LOUD HOTEL is only a 10 minute drive from Ibiza Airport. The hotel is perfect for families and includes a pool and a beach. — 604

FIG. 7

DEVICE, SYSTEM AND METHOD FOR PROVIDING DESCRIPTIONS TO COMMUNICATION DEVICES USING MACHINE LEARNING GENERATED TEMPLATES

BACKGROUND

Providing descriptions of items via communication networks can be challenging to perform efficiently. For example, a communication device may be used to request a description of an item from a server, and the server may respond with a description only when such a description is available. When such a description is not available, waste of processing resources and bandwidth may result, at least in the generation and transmission of the request, and generation and transmission of a response in the form of an error message. In some instances, the request may be for the description to be in a given language, and the description may not be available in the given language, which may further lead to waste of processing resources and bandwidth.

SUMMARY

A first aspect of the specification provides a method comprising: replacing, by a computing device, given word types in provided text files with corresponding tags to generate corresponding intermediate templates, the provided text files associated with a given topic; generating for the given topic, by the computing device, one or more textual templates that include at least a portion of the corresponding tags, the one or more textual templates in natural language sentences, the generating of the one or more textual templates at least partially based on the corresponding intermediate templates; populating, by the computing device, the corresponding tags in a textual template, of the one or more textual templates, with corresponding words of a given data file associated with the given topic, to generate a respective description of a given item associated with the given topic, the given data file being specific to the given item; and providing, by the computing device and a communication interface, the respective description to a communication device.

At the method of the first aspect, the corresponding intermediate templates may be generated using at least a first machine learning algorithm, and the corresponding intermediate templates may be used to train at least a second machine learning algorithm to generate the one or more textual templates.

The method of the first aspect may further comprise: generating an initial larger set of a plurality of the textual templates; generating an efficacy metric for each of the plurality of the textual templates of the larger set; and selecting a subset of the initial larger set of the plurality of the textual templates as one or more final textual templates based on the efficacy metric, the textual template for which the corresponding tags are populated being selected from the one or more final textual templates.

The method of the first aspect may further comprise: generating an initial larger set of a plurality of the textual templates; generating a perplexity metric for each of the plurality of the textual templates of the larger set; and selecting a subset of the initial larger set of the plurality of the textual templates as one or more final textual templates based on the perplexity metric.

The method of the first aspect may further comprise: randomly selecting the textual template from the one or more textual templates.

The method of the first aspect may further comprise: accessing one or more of a profile associated with the communication device and text information on the given topic associated with the communication device available to the computing device; and selecting the textual template from the one or more textual templates based on one or more of the profile and the text information.

The method of the first aspect may further comprise: accessing one or more of a profile associated with the communication device and text information on the given topic associated with the communication device available to the computing device; and selecting the corresponding words from the given data file to populate the corresponding tags in the textual template, to generate the respective description, based on one or more of the profile and the text information.

The method of the first aspect may further comprise: when a given corresponding tag of the textual template does not correspond to words in the given data file, deleting respective words of the textual template associated with the given corresponding tag.

At the method of the first aspect: the provided text files may comprise human-generated text files; the given data file may comprise one or more of: an Extensible Markup Language (XML) file; and the corresponding words stored in association with respective tags; and the respective description may comprise a computer-generated file.

The method of the first aspect may further comprise: prior to providing the respective description to the communication device, translating the respective description from a first language into a second language selected based on one or more of: a location of the communication device; and an indication of the second language as received from the communication device.

The method of the first aspect may further comprise: receiving, from the communication device, a request for a description of the given item; selecting the given data file based on the request; generating the respective description in response to receiving the request; and providing the respective description to the communication device in response to receiving the request.

A second aspect of the specification provides a device comprising: a communication interface; and a controller having access to one or more memories storing provided text files associated with a given topic and a given data file associated with the given topic, the controller configured to: replace given word types in the provided text files with corresponding tags to generate corresponding intermediate templates; generate, for the given topic, one or more textual templates that include at least a portion of the corresponding tags, the one or more textual templates being in natural language sentences, generating of the one or more textual templates at least partially based on the corresponding intermediate templates; populate the corresponding tags in a textual template, of the one or more textual templates, with corresponding words of the given data file to generate a respective description of a given item associated with the given topic, the given data file being specific to the given item; and provide, by the communication interface, the respective description to a communication device.

At the device of the second aspect, the controller may be further configured to: generate the corresponding intermediate templates using at least a first machine learning algorithm; and use the corresponding intermediate templates to train at least a second machine learning algorithm to generate the one or more textual templates.

At the device of the second aspect, the controller may be further configured to: generate an initial larger set of a plurality of the textual templates; generate an efficacy metric for each of the plurality of the textual templates of the larger set; and select a subset of the initial larger set of the plurality of the textual templates as one or more final textual templates based on the efficacy metric, the textual template for which the corresponding tags are populated being selected from the one or more final textual templates.

At the device of the second aspect, the controller may be further configured to: generate an initial larger set of a plurality of the textual templates; generate a perplexity metric for each of the plurality of the textual templates of the larger set; and select a subset of the initial larger set of the plurality of the textual templates as one or more final textual templates based on the perplexity metric.

At the device of the second aspect, the controller may be further configured to: randomly select the textual template from the one or more textual templates.

At the device of the second aspect, the controller may be further configured to: access, at the one or more memories, one or more of a profile associated with the communication device and text information on the given topic associated with the communication device; and select the textual template from the one or more textual templates based on one or more of the profile and the text information.

At the device of the second aspect, the controller may be further configured to: access, at the one or more memories, one or more of a profile associated with the communication device and text information on the given topic associated with the communication device; and select the corresponding words from the given data file to populate the corresponding tags in the textual template, to generate the respective description, based on one or more of the profile and the text information.

At the device of the second aspect, the controller may be further configured to: when a given corresponding tag of the textual template does not correspond to words in the given data file, delete respective words of the textual template associated with the given corresponding tag.

At the device of the second aspect: the provided text files may comprise human-generated text files; the given data file may comprise one or more of: an Extensible Markup Language (XML) file; and the corresponding words stored in association with respective tags; and the respective description may comprise a computer-generated file.

At the device of the second aspect, the controller may be further configured to: prior to providing the respective description to the communication device, translate the respective description from a first language into a second language selected based on one or more of: a location of the communication device; and an indication of the second language as received from the communication device.

At the device of the second aspect, the controller may be further configured to: receive, from the communication device, a request for a description of the given item; select the given data file based on the request; generate the respective description in response to receiving the request; and provide the respective description to the communication device in response to receiving the request.

BRIEF DESCRIPTIONS OF THE DRAWINGS

For a better understanding of the various examples described herein and to show more clearly how they may be carried into effect, reference will now be made, by way of example only, to the accompanying drawings in which:

FIG. 7 depicts an example of generating a description from a data file and a textual template, according to non-limiting examples.

DETAILED DESCRIPTION

Figure 1:
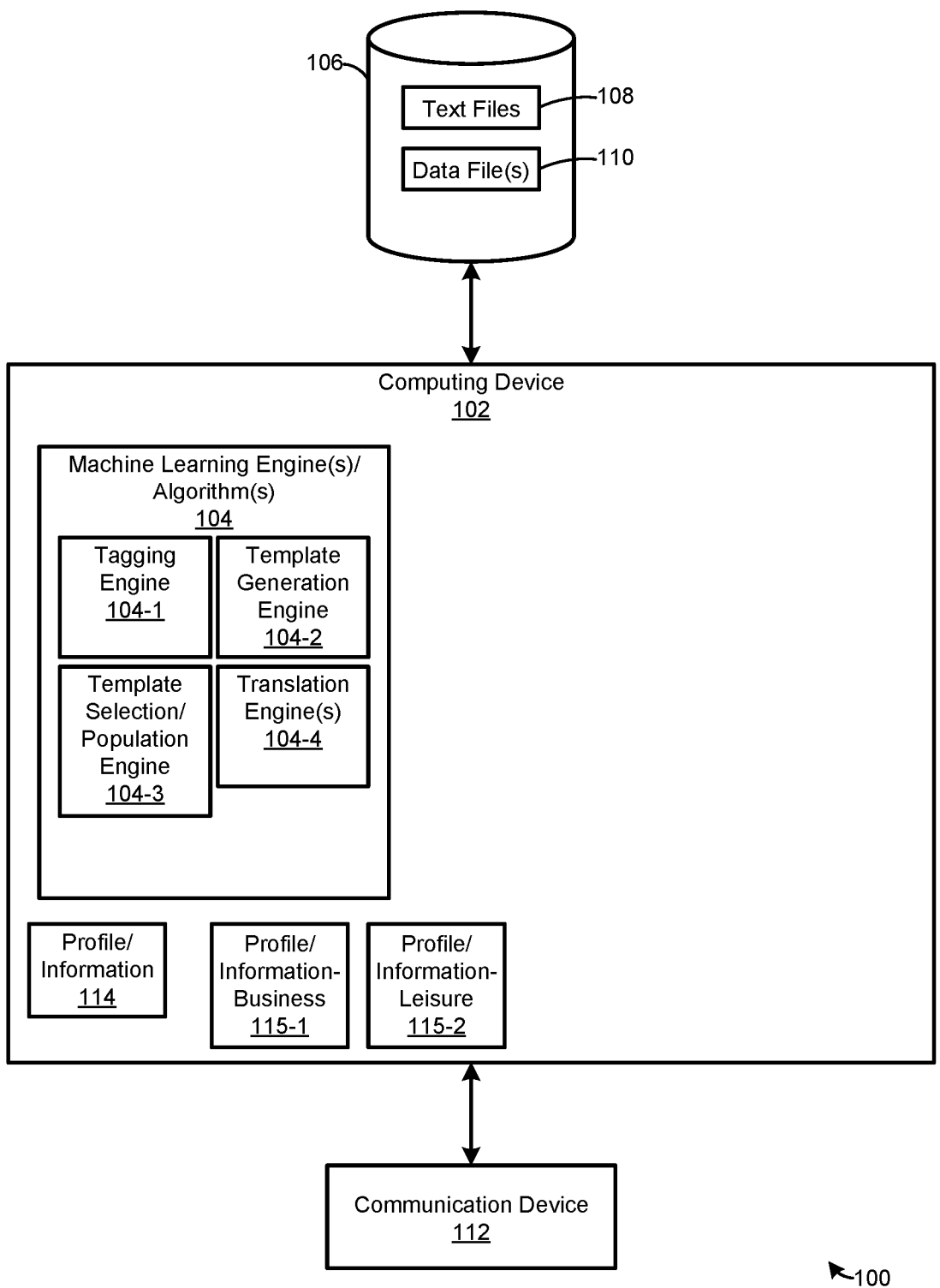
FIG. 1 depicts a system for providing descriptions to communication devices using machine learning generated templates, according to non-limiting examples.

Attention is directed to FIG. 1 which depicts a system 100 for providing descriptions to communication devices using machine learning generated templates.

The components of the system 100 are generally in communication via communication links which are depicted in FIG. 1, and throughout the present specification, as double-ended arrows between respective components. The communication links includes any suitable combination of wireless and/or wired communication networks and, similarly, the communication links may include any suitable combination of wireless and/or wired links.

The system 100 will furthermore be described with respect to engines. As used herein, the term "engine" refers to hardware (e.g., a processor, such as a central processing unit (CPU), graphics processing unit (GPU), an integrated circuit or other circuitry) or a combination of hardware and software (e.g., programming such as machine- or processor-executable instructions, commands, or code such as firmware, a device driver, programming, object code, etc. as stored on hardware). Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or implemented or interpreted by a processor), or hardware and software hosted at hardware.

A system 100 comprises a computing device 102 implementing one or more machine learning engines 104, for example to implement one or more machine learning algorithms. Hereafter, for simplicity, the one or more machine learning engines 104 and/or machine learning algorithms will be interchangeably referred to as the machine learning engine 104. Various other engines, which may also comprise machine learning engines and/or may be one or more of the machine learning engines 104, are described in more detail below. Furthermore, it is understood that the term "machine learning algorithm", and the like, may be used interchangeably herein with the term "machine learning model".

As depicted, the computing device 102 has access to one or more memories 106, for example, as depicted, provided as one or more databases, file systems, and the like, which store provided text files 108 associated with a given topic. For simplicity, the one or more memories 106 will be interchangeably referred to as the memory 106. Furthermore, in some examples, at least one of the one or more memories 106 may be a component of the computing device 102; in a particular example, components such as machine learning models and/or algorithms, machine learning training sets, and the like, may be stored at a memory of the computing device 102.

As depicted, the one or more memories 106 further store data files 110 associated with the given topic. In particular, the provided text files 108 and the data files 110 may comprise textual files that describe aspects of the given topic, but from different data sources. In a particular example, the given topic may be "hotels" and the provided text files 108 may comprise "basic" and/or brief descriptions of hotels, and/or capsule descriptions of the hotels, in a particular language (e.g. such as English), that have been provided by the hotels, and the like, for example to an airline booking system, airline aggregator systems, and the like. In particular, the provided text files 108 may comprise human-generated text files (e.g. provided by a manager, and the like of a hotel as sentences describing the hotel) provided to an airline booking system, airline aggregator systems, and the like, and stored at the memory 106 (and/or any suitable memory to which the computing device 102 has access).

In contrast, the data files 110 may also include descriptions of hotels, but from a different data source than the provided text files 108. For example, the data files 110 may be from more generic travel websites and/or hotel websites and/or hotel booking websites and/or websites that include listings of hotels, and the like, as compared to the data sources of the provided text files 108. As such, the data files 110 may include more information on the hotels than the provided text files 108. For example, the provided text files 108 may comprise brief, capsule descriptions of the hotels, while the data files 110 may comprise a longer and/or richer description of the hotels (e.g. in more marketing-based language) which describe more features of the hotels than may be in one text file 108; however, in other examples, the data files 110 may include same and/or similar information as a text file 108 and/or less information than a text file 108. It is further understood that a data file 110 may exist for a given item (e.g. a hotel), and the like, and a text file 108 for that given item may not exist, and vice versa.

In particular, as the data files 110 may be retrieved from websites, the data files 110 may comprise Extensible Markup Language (XML) files, and the like (e.g. as integrated into code for a website). Furthermore, in some examples, a data file 110 may have given words stored in association with corresponding tags (e.g. in an XML format); for example, words describing a name of a hotel may be tagged in XML with an <HotelName> tag, and the like. The data files 110 are understood to be stored at the memory 106, and/or any suitable memory to which the computing device 102 has access; such access may include the computing device 102 accessing websites associated with hotels, with the data files 110 being provided in the form of code for such websites, and the like. In some examples, the data files 110 may be downloaded from such websites and stored at a memory associated with the computing device 102 (e.g. operated by a same entity that operates the computing device 102), and/or the data files 110 may be accessed by the computing device 102 when an associated description is being generated, as described in more detail below.

It is further understood that the hotels (and/or other items associated with a given topic) described by the text files 108 and the data files 110 may be the same, or different, and may not be provided in a one-to-one relationship.

Furthermore, while the files 108, 110 are described as being associated with a given topic of "hotels", the files 108, 110 may be associated with any suitable given topic. For example, in the context of the travel industry, the files 108, 110 may be associated with a given topic that may include, but are not limited to, airlines, tourist attractions, and the like. However, the files 108, 110 may be associated with a given topic that is not specifically associated with the travel industry, such as restaurants, retail stores, and the like, among other possibilities.

As depicted, the system 100 further comprises a communication device 112 which may request a description of a given item associated with the given topic.

In a particular example, components of the system 100 may generally be associated with, and/or operated by an entity, such as a company, and the like, that may provide computer-based services, and in particular computer-based services for the travel industry, via the system 100. For example, the computing device 102 may comprise one or more servers and/or cloud computing devices that provide descriptions of given items associated with a given topic related to the travel industry, with the computing device 102 operated by a travel industry related entity, such as an airline, an aggregator, and the like (e.g. and hence the text files 108 may be maintained by the same entity which operates the computing device 102).

Similarly, the communication device 112 may comprise a terminal of a travel agency, an airport, an airline office, and the like, and/or the communication device 112 may comprise a communication device and/or computing device of a consumer. As such, the communication device 112 may access the computing device 102 (e.g. via a network, and the like, such as the Internet, for example via a browser and/or special purpose application, and the like) to perform searches for given items associated with the given topic and/or descriptions of the given items associated with the given topic.

In general, the computing device 102, in response to a request from the communication device 112, may initially be configured to merely provide a text file 108 that corresponds to information in the request, when available. When a text file 108 that corresponds to information in the request is not available, an error message may be returned to the communication device 112 by the computing device 102. In some examples, the request from the communication device 112 may be for information in a particular language, and a text file in the particular language may not exist at the memory 106, which may also result in an error message. However, even when a text file 108 which corresponds to information in the request is in the particular language, the text file 108 may not include sufficient information for a user of the communication device 112 to make a decision in relation to a given item described by the text file 108 (e.g. such as whether or not to book a hotel described by the text file 108). In some instances, such information may be available in the data files 110, but the data files 110 may be provided in many different formats and/or styles which may not be adequate to merely provide a response to the communication device 112.

As such, as described herein, the computing device 102 is generally configured to use the text files 108 to generate text templates in natural language sentences. In particular, given word types in the provided text files 108 are generally replaced with corresponding tags to generate corresponding intermediate templates which may correspond to the text files 108 with the given words replaced with the corresponding tags. The intermediate templates may then be used to generate one or more textual templates (e.g. one or more generic textual templates) in natural language sentences. The one or more textual templates generally include tags that may be replaced with corresponding words from the data files 110. Hence, when a request for description of a given item associated with a given topic is received at the computing device 102 from the communication device 112, the computing device 102 may populate the tags of a textual template with words from a data file 110 that corresponds to the given item in the request.

In general, while as few as one textual template may be generated, a plurality of textual templates may be generated, such as tens, hundreds and/or thousands of textual templates, and the like. Hence, hereafter, while reference may be made to generating one textual template, or a plurality of textual templates, it is understood that one or more textual templates may be generated.

When a plurality of textual templates are generated, the computing device 102 may generate a respective efficacy metric and/or a respective perplexity metric for the plurality of textual templates. The computing device 102 may select a subset of the plurality of textual templates, based on one or more of the metrics, as final textual templates from which a textual template may be selected. For example, textual templates having a perplexity metric that is below a threshold perplexity metric value may be selected as final textual templates from which a textual template may be selected and/or a given number of the textual templates that have lowest perplexity metrics may be selected as final textual templates from which a textual template may be selected.

Hence, it is generally understood that while one text file 108 may only provide a capsule description, and the like, of one given item, such as a hotel, the provided text files 108 as a group may provide examples of different short descriptions of given items described in different ways, and/or describing different aspects of the given items and/or different amenities associated with the given items. For example, one provided text file 108 may include a description of business amenities provided at one hotel (e.g. but not leisure amenities), while another provided text file 108 may include a description of leisure amenities provided at a second hotel (e.g. but not business amenities). A textual template may be generated from both of these text files 108 (e.g. and other text files 108) that include tags for both business amenity word types and leisure amenity word types, with sentences generated that include the tags based on natural language processing; words from a data file 110 for a third hotel may be used to populate the tags to generate a description for the third hotel.

It is generally understood that the corresponding intermediate templates may be generated using at least a first machine learning engine 104 and/or algorithm, and the corresponding intermediate templates may be used to train at least a second machine learning engine 104 and/or algorithm to generate the textual templates, as described in more detail below. As such, it is understood that the provided text files 108, combined with replacement of given word types in the provided text files 108 with corresponding tags (e.g. the corresponding intermediate templates), may comprise a body of training data used to train a machine learning engine 104 to generate the textual templates, as described in more detail below.

Hence, in particular, textual templates are understood to comprise machine learning generated templates.

In some examples, as depicted, the computing device 102 may have access to a profile 114 and/or text information on the given topic, and the like, associated with the communication device 112, which may be used to select a textual template to populate with words from a data file 110. For example, the profile 114 may indicate that a user of the communication device 112 is more interested in business amenities than leisure amenities and a textual template that includes more tags for business amenities than leisure amenities may be selected. While the profile 114 is depicted as being at the computing device 102, the profile 114 may be stored at the memory 106 (e.g. with other profiles of other users).

Similarly, the profile 114 may be used to select words from a data file 110 to populate tags in a textual template. For example, a tag in a textual template may be for leisure amenities nearby a hotel, and a data file 110 for the hotel may indicate that there is both a museum and an amusement park near the hotel, with words describing the museum and the amusement park present in the data file 110 that may be used to populate the tag in the textual template for leisure amenities. The profile 114 may indicate that a user of the communication device 112 is more interested in museums than amusement parks and hence, the tag for leisure amenities in the textual template may be populated with the words describing the museum from the data file 110.

The profile 114 and/or information may be further based on, and/or include, reviews, ratings and/or comments for hotels (and/or other given items) generated by a user of the communication device 112 posted on travel web sites, and the like (which may include, but is not limited to, a review, rating and/or comments for a hotel for which the user of the communication device 112 may be presently requesting a description, and/or other hotels, and the like). As such, the computing device 102 may be configured to access such reviews to populate the profile 114, for example to determine preferences of a user of the communication device 112.

In some examples, as depicted, the computing device 102 may have access to other types of profiles 115-1, 115-2 and/or text information on the given topic and/or a given item, which may be used to select a textual template to populate with words from a data file 110. The profiles 115-1, 115-2 will be interchangeably referred to hereafter, collectively as the profiles 115 and, generically, as a profile 115. Furthermore while two profiles 115 are depicted, there may be as few as one profile 115 (e.g. and/or one set of text information on the given topic and/or the given item), or there may be more than two profiles 115 (e.g. and/or more than two sets of text information on the given topic and/or the given item). While the profiles 115 are depicted as being at the computing device 102, the profile 115 may be stored at the memory 106.

As depicted, the profile 115-1 may store information and/or general preferences of users of the system 100 (which may include the user of the communication device 112 and/or other users of other communication devices) that are more interested in business amenities than leisure amenities. Similarly, the profile 115-2 may store information and/or general preferences of users of the system 100 (which may include the user of the communication device 112 and/or other users of other communication devices) that are more interested in leisure amenities than business amenities. The profiles 115 may be generated by the computing device 102 and/or populated by an administrator of the system 100, and the like, and include generic information and/or generic general preferences of business or leisure travelers, and the like.

However, the profiles 115 and/or information may be further based on, and/or include, reviews, ratings and/or comments for hotels (and/or other given items) generated by a user of the communication device 112 posted on travel web sites, and the like (which may include, but is not limited to, a review, rating and/or comments for a hotel for which the user of the communication device 112 may be presently requesting a description, and/or other hotels, and the like). Furthermore, in particular, the profile 115-1 may include, and/or be based on, reviews of hotels by business travelers, and the profile 115-2 may include, and/or be based on, reviews of hotels by leisure travelers.

Hence, in general, when the user of the communication device 112 requests a description of a particular hotel, the request may indicate that a description of a particular hotel is for a business trip, or the request may indicate that a description of a particular hotel is for a leisure trip. As such, depending on such an indication, the profile 115-1, or the profile 115-2, may be used to select a textual template accordingly.

For example, when the request indicates that a description of a particular hotel is for a business trip, the profile 115-1 may indicate that other business travelers mentioned preferences for given business amenities in reviews, and hence a textual template that includes tags for such given business amenities may be selected. Similarly, when the request indicates that a description of a particular hotel is for a business trip, the profile 115-1 may indicate that other business travelers mentioned preferences for given business amenities in reviews, and tags of a textual template may be populated with corresponding words from a data file 110 that correspond to such given business amenities. Indeed, the profile 115-1 may include reviews, and the like, of other business travelers of a particular hotel (e.g. a given hotel and/or a given item) for which the user of the communication device 112 is requesting a description.

For example, when the request indicates that a description of a particular hotel is for a leisure trip, the profile 115-2 may indicate that other leisure travelers mentioned preferences for given leisure amenities in reviews, and hence a textual template that includes tags for such given leisure amenities may be selected. Similarly, when the request indicates that a description of a particular hotel is for a leisure trip, the profile 115-2 may indicate that other leisure travelers mentioned preferences for given leisure amenities in reviews, and tags of a textual template may be populated with corresponding words from a data file 110 that correspond to such leisure amenities. Indeed, the profile 115-2 may include reviews, and the like, of other leisure travelers of a particular hotel (e.g. a given hotel and/or a given item) for which the user of the communication device 112 is requesting a description. While profiles 115 that correspond to business and leisure travelers are described, the profiles 115 may include other types of profiles for other types of travelers, for example according to age, gender, singles travel, couples travel, romantic travel, group travel, and/or any other suitable type of travelers. In these examples, a request from the communication device 112 for a description of a given item may include an indication of a type of profile 115 that is to be selected (e.g. a particular age, singles travel, couples travel, romantic travel, group travel, etc.).

Furthermore, while the profiles 114, 115 are described with respect to hotels (e.g. a given topic of hotels and/or a given item of a particular hotel), the profiles 114, 115 may be associated with a given topic and/or a given item that is not specifically associated with the travel industry, such as restaurants, a particular given restaurant, retail stores, a particular given retail store, and the like, among other possibilities As depicted, the machine learning engines 104 may include various machine learning engines for performing specific functionality.

For example, the machine learning engines 104 may comprise a tagging engine 104-1, which may comprise a machine learning engine to implement a machine learning algorithm configured to replace given word types in the provided text files 108 with corresponding tags to generate the corresponding intermediate templates. For example, the tagging engine 104-1 may be preconfigured with a list of given words to replace with corresponding tags and/or the tagging engine 104-1 may be preconfigured and/or trained to identify given word types on the basis of sentence structure, placement of prepositions, and the like.

For example, the tagging engine 104-1 may be trained to identify hotel names via words such as "hotel", "inn" and the like, as well as capitalized words preceding such words. In a particular example, the sentence "The Acme Inn is a 3 star hotel that welcomes you, a 5 minute walk from the metro station Porte de Saint-Cloud" may be in a provided text file 108, and the tagging engine 104-1 may identify "Acme Hotel" as being a hotel name as the word "Inn" appears capitalized, and the capitalized word "Acme" immediately precedes the word "Inn".

Similarly, a number of stars for a hotel may be identified via the word "star" preceded by a number. Continuing with the example above, the tagging engine 104-1 may identify "3" as being a number of stars for a hotel name as the word "star" appears after the number "3".

Similarly, the tagging engine 104-1 may be trained to identify timed distances in provided text files 108 via use of temporal words and/or numbers in combination with verbs, and the like. Continuing with the example above, the tagging engine 104-1 may identify "5 minute walk" as being a timed distance to the hotel (e.g. from a location) as the number "5" precedes the temporal word "minute", which precedes the verb "walk".

Similarly, the tagging engine 104-1 may be trained to identify locations in provided text files 108 via prepositions, and the like, that proceed nouns (e.g. and/or capitalized nouns). Continuing with the example above, the tagging engine 104-1 may identify "the metro station Porte de Saint-Cloud" as being a name of a metro station, due to the words "metro station" that proceed capitalized words "Porte de Saint-Cloud" and which is proceeded by the preposition "from".

Hence, in this examples, the tagging engine 104-1 may generate, from the sentence "The Acme Inn is a 3 star hotel that welcomes you, a 5 minute walk from the metro station Porte de Saint-Cloud", a tagged sentence of "The <HotelName> is a <NumberStar> star hotel that welcomes you a <TimedWalkingDistance> from <MetroStation>". In particular, the tag <Hotelname> replaces the hotel name of "Acme Inn", the tag <NumberStar> replaces the number "3", the tag <TimedWalkingDistance> replaces the phrase "5 minute walk" and the tag <MetroStation> replaces the phrase "the metro station Porte de Saint-Cloud". In particular, the tagged sentence "The <Hotelname> is a <Number-Star> star hotel that welcomes you a <TimedWalkingDistance> from <MetroStation>", may be a sentence of a corresponding intermediate template generated by the tagging engine 104-1 (e.g. which corresponds to the provided text file 108 in which the initial sentence appears).

In general, the tagging engine 104-1 may be trained to replace any suitable number of given word types with corresponding tags.

Furthermore, in a particular example, the tagging engine 104-1 may be provided as a long short-term memory (LSTM) type neural network that performs named-entity recognition (NER) to replace any suitable number of given word types with corresponding tags.

In some specific example, the tagging engine 104-1 may comprise a Bi-LSTM type neural network with three recurrent layers and a respective dropout layer between recurrent layers. In some of these examples, such a Bi-LSTM type neural network may include a selected dropout rate of 0.5 for replacing any suitable number of given word types with corresponding tags. A dropout rate of 0.5 was selected heuristically in these examples by applying the Bi-LSTM type neural network using different dropout rates to a training set (e.g. a subset of the text files 108 and/or other, similar, text files) and determining that the dropout rate of 0.5 was one optimal value having a best tagging performance as compared to other dropout rates tested (e.g. best tagging performance being understood, in some examples, to have best precision in one or more NER classification tasks). However, any suitable dropout rate is within the scope of the present specification.

As depicted, the machine learning engines 104 may further comprise a template generation engine 104-2, which may comprise a machine learning engine to implement a machine learning algorithm configured to generate textual templates as described herein. In particular, the output from the tagging engine 104-1 (e.g. the corresponding intermediate templates) may be used to train the template generation engine 104-2 to generate textual templates. In general, the template generation engine 104-2 be configured to generate natural language sentences in the textual templates; hence, for example, the template generation engine 104-2 may include a natural language processing (NLP) engine. Furthermore, the template generation engine 104-2 may be trained to generate the textual templates based on the metrics described herein, amongst other possibilities, and described in more detail below.

Furthermore, in a particular example, the template generation engine 104-2 may be provided as recurrent neural network that performs text generation (e.g. using natural language processing, and the like).

In some specific example, the template generation engine 104-2 may comprise an LSTM type neural network with three recurrent layers and four transformer layers and with various hyperparameters selected heuristically to prevent and/or reduce overfitting. For example prevention and/or reduction of overfitting may result in generation of a diverse set of textual templates and/or a reduction of redundancy in the set of textual templates. In some examples, a dropout rate of 0.4 may be used (e.g. selected heuristically), however, any suitable dropout rate is within the scope of the present specification.

As depicted, the machine learning engines 104 may further comprise a template selection/population engine 104-3 (interchangeably referred to hereafter, for simplicity, as the template population engine 104-3), which may comprise a machine learning engine to implement a machine learning algorithm configured to populate and/or adjust the textual templates based on one or more of the profile 114 (e.g. and/or other information associated with the communication device 112), a profile 115, words in a data file 110 used to populate a textual template, and the like. For example, when the profile 114 indicates that a user of the communication device 112 generally travels for leisure and not business, the template population engine 104-3 may select a textual template with more tags associated with leisure amenities as compared to other textual templates with business amenity related tags. Similarly, when the profile 114 indicates that a user of the communication device 112 generally prefers museums over amusement parks, the template population engine 104-3 may populate tags associated with leisure amenities in a textual template with the words associated with museums from a data file 110. Similarly, when a request for a description of a given item, such as a hotel, is received, and the request indicates a type of a profile 115 that may be selected, the template population engine 104-3 may select a textual template with more tags associated with a type of a profile 115 (e.g. more business amenity related tags, or more leisure amenity related tags, as compared to other textual templates). Similarly, when a type of profile 115 indicated in a request indicates that other users generally prefers one or types of amenities over other types of amenities (e.g. for leisure travel, museums over amusement parks), the template population engine 104-3 may populate tags associated with such amenities in a textual template with the words, associated with such amenities, from a data file 110.

Furthermore, in some examples, the template population engine 104-3 may be used to delete tags from a textual template that do not correspond to words in a given data file 110. For example, when a textual template includes tags for leisure amenities and business amenities, but a given data file 110 being used to populate the tags of a textual template does not include words associated with business amenities, the template population engine 104-3 may delete such tags and further delete respective words of the textual template associated with such tags.

It is hence further understood that the template population engine 104-3 is generally configured to identify words in a data file 110 that correspond to tags in a textual template and populate such tags accordingly.

As depicted, the machine learning engines 104 may further comprise one or more translation engines 104-4 which may comprise a machine learning engine to implement a machine learning algorithm configured to translate descriptions from one language, such as English, into one or more other languages, such French, Chinese, and the like.

It is however, understood that while particular machine learning engines 104 are depicted, in other examples, the functionality of the computing device 102 may be provided with any suitable types and/or combinations of machine learning engines 104, and the like.

Figure 2:
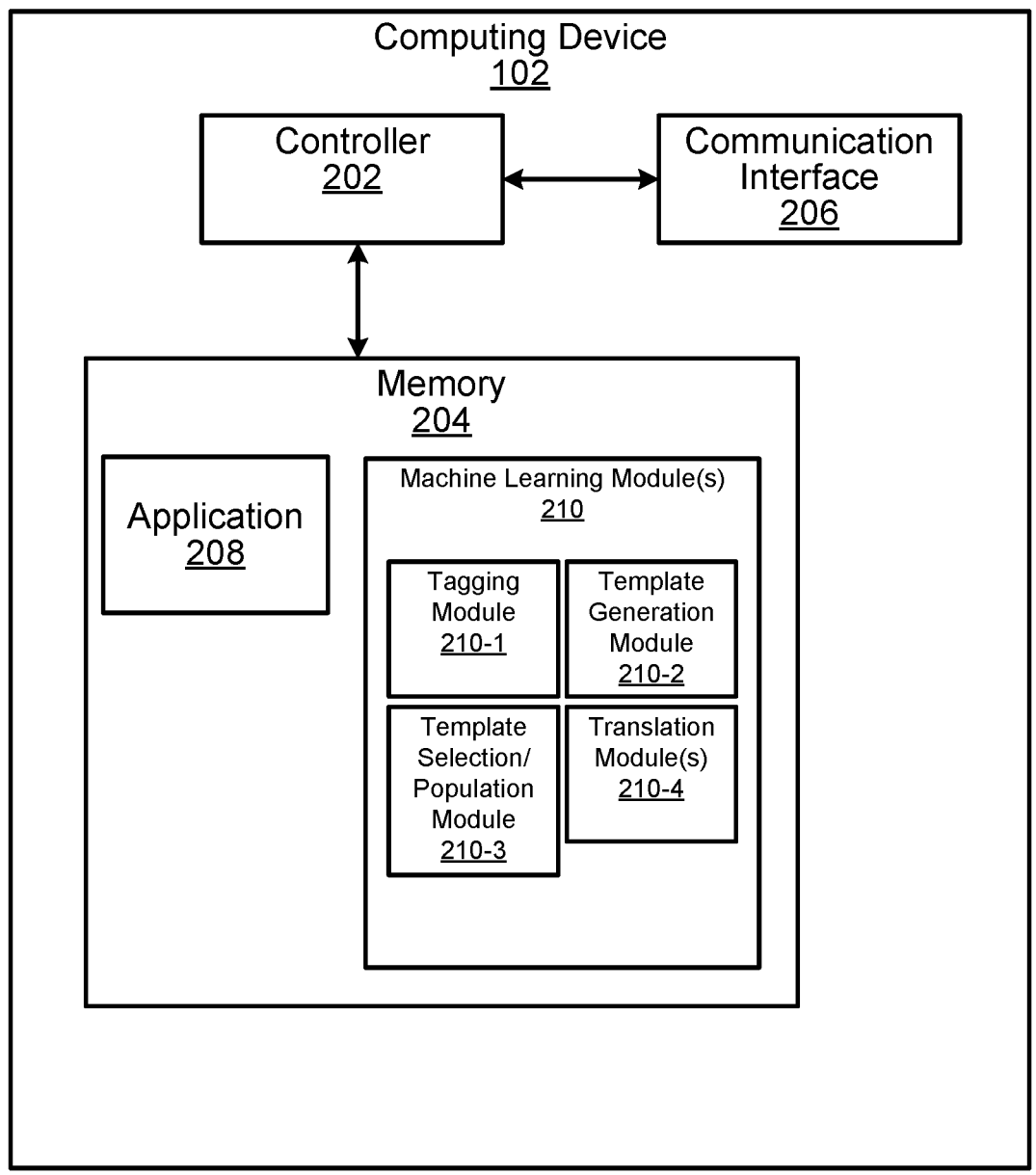
FIG. 2 depicts a device for providing descriptions to communication devices using machine learning generated templates, according to non-limiting examples.

Attention is next directed to FIG. 2 which depicts a block diagram of an example of the computing device 102 that includes a controller 202 communicatively coupled to a memory 204 and a communication interface 206. It is furthermore understood that the computing device 102 may be implemented as one or more servers and/or one or more cloud computing devices, with functionality thereof distributed across one or more servers and/or one or more cloud computing devices. As such, the computing device 102 may be implemented at different cloud computing devices in communication with each other, for example distributed geographically, and which may coordinate implementation of the functionality described herein.

The controller 202 comprise one or more general-purpose processors and/or one or more special purpose logic devices, such as microprocessors (e.g., a central processing unit, a graphics processing unit, etc.), a digital signal processor, a microcontroller, an ASIC, an FPGA, a PAL (programmable array logic), a PLA (programmable logic array), a PLD (programmable logic device), etc.

The controller 202 is interconnected with the memory 204 which may comprise any suitable memory that stores instructions, for example, as depicted, in the form of applications and/or modules that, when implemented by the controller 202, cause the controller 202 to implement the functionality described herein including, but not limited to the machine learning engine 104 and/or a machine learning engine. The memory 204 may be implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The controller 202 and the memory 204 may be generally comprised of one or more integrated circuits (ICs).

The controller 202 is also interconnected with a communication interface 206, which generally enables the computing device 102 to communicate with the other components of the system 100 via one or more communication links. The communication interface 206 therefore includes any necessary components (e.g. network interface controllers (NICs), radio units, and the like) to communicate with the other components of the system 100 via one or more communication links (e.g. via one or more communication networks). The specific components of the communication interface 206 may be selected based on upon types of the communication links. The computing device 102 may also include input and output devices connected to the controller 202, such as keyboards, pointing devices, display screens, and the like (not shown).

The memory 204 includes an application and modules. As used herein, an "application" and/or a "module" (in some examples referred to as a "software module") is a set of instructions that when implemented or interpreted by a controller and/or a processor, or stored at a processor-readable medium realizes a component or performs a method.

As depicted, the memory 204 stores an application 208, which corresponds to functionality described below with respect to blocks of a method 300 of FIG. 3, and one or more machine learning modules 210 which correspond to functionality of the one or more machine learning engines 104. In general, the application 208, when implemented by the controller 202, may be configured to control interactions between the machine learning engines 104 and/or provide any other suitable functionality as described herein, as described below with respect to the method of FIG. 3. Similarly, a tagging module 210-1 may be implemented by the controller 202 to implement the tagging engine 104-1, a template generation module 210-2 may implemented by the controller 202 to implement the template generation engine 104-2, a template selection/population module 210-3 may implemented by the controller 202 to implement the template selection/population engine 104-3, and one or more translation module 210-4 may implemented by the controller 202 to implement the one or more translation engines 104-4.

While FIG. 2 does not depict the profiles 114, 115 being stored at the memory 204, in other examples, the profiles 114, 115 may be stored at the memory 204. However, as mentioned above, the profiles 114, 115 may be stored at the memory 106.

Figure 3:
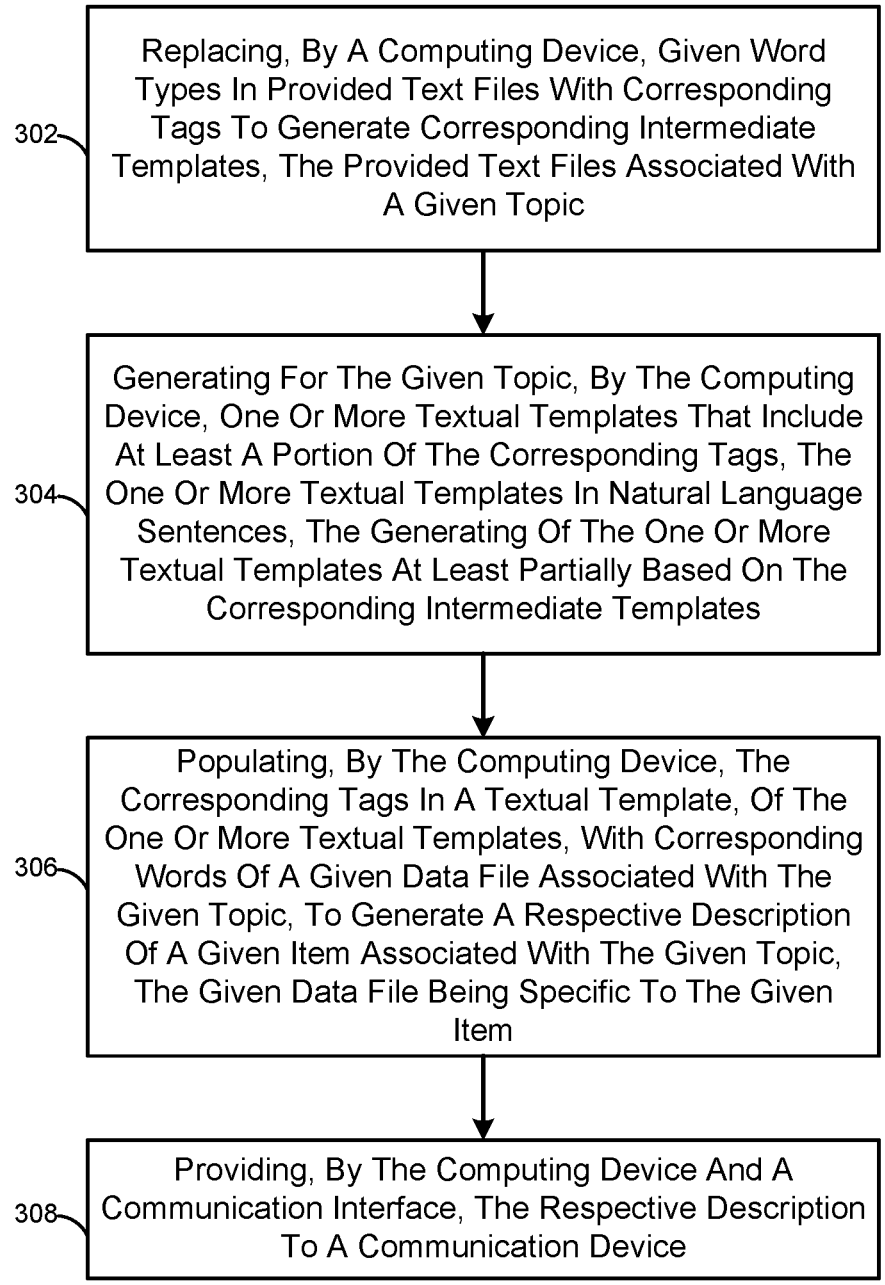
FIG. 3 depicts a method for providing descriptions to communication devices using machine learning generated templates, according to non-limiting examples.

Attention is now directed to FIG. 3 which depicts a flowchart representative of a method 300 for providing descriptions to communication devices using machine learning generated templates. The operations of the method 300 of FIG. 3 correspond to machine readable instructions that are executed by the computing device 102 (e.g. and/or by one or more cloud computing devices), and specifically the controller 202 of the computing device 102 (and/or by controllers of one or more cloud computing devices). In the illustrated example, the instructions represented by the blocks of FIG. 3 may be stored at the memory 204 for example, at least in part as the application 208 and/or the modules 210. In some examples, the controller 202 implementing the application 208 may, in conjunction, implement one or more machine learning engines 104 corresponding to the modules 210. The method 300 of FIG. 3 is one way in which the computing device 102, and/or the controller 202 and/or the system 100 may be configured. However, while the method 300 is specifically described with regards to being implemented by the controller 202 and/or the computing device 102, it is understood that the method 300 may be implemented by one or more cloud computing devices and/or one or more controllers thereof.

Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 202 and/or the computing device 102, replaces given word types in the provided text files 108 with corresponding tags to generate corresponding intermediate templates, the provided text files 108 associated with a given topic. In particular, such replacement may occur via the tagging engine 104-1 as described above.

At a block 304, the controller 202 and/or the computing device 102, generates for the given topic, one or more textual templates that include at least a portion of the corresponding tags, the one or more textual templates in natural language sentences, the generating of the one or more textual templates at least partially based on the corresponding intermediate templates. In particular, such generation may occur via the template generation engine 104-2 as described above.

Hence, the corresponding intermediate templates of the block 302 may be generated using at least a first machine learning algorithm, such as a first machine learning algorithm implemented by the tagging engine 104-1, and the corresponding intermediate templates may be used to train at least a second machine learning algorithm to generate the one or more textual templates, such as a second machine learning algorithm implemented by the template generation engine 104-2.

As such, it is understood that the block 302 and/or the block 304 may further include the controller 202 and/or the computing device 102 training the template generation engine 104-2 to generate the one or more textual templates using the corresponding intermediate templates generated by tagging engine 104-1 as input.

In some examples, the one or more textual templates may comprise one or more structured textual templates (e.g. structured according to a document object model (DOM) and the like), with a parent sentence and/or parent node, and associated child sentences and/or child nodes. In a particular example for a given topic comprising "hotels", a parent sentence and/or parent node of a textual template may comprise a sentence and tags associated with general information about a hotel, such as a <HotelName> tag, a <HotelAddress> tag and/or a <HotelLocation> tag, and a <NumberStar> tag; first child sentences and/or child nodes of the textual template may comprise sentences and tags associated with leisure amenities available at the hotel, such as one or more <LeisureAmenity> tags, and the like; second child sentences and/or child nodes of the textual template may comprise sentences and tags associated with business amenities available at the hotel, such as one or more <BusinessAmenity> tags, and the like; third child sentences and/or child nodes of the textual template may comprise sentences and tags associated with leisure amenities and/or tourist locations near the hotel, such as one or more <Location> tags, and the like. Hence, when a given type of tags (e.g. as business amenity tags) is to be deleted, the child sentences and/or nodes associated with the given type may be deleted.

At a block 306, the controller 202 and/or the computing device 102 populates the corresponding tags in a textual template, of the one or more textual templates, with corresponding words of a given data file 110 associated with the given topic, to generate a respective description of a given item associated with the given topic, the given data file 110 being specific to the given item.

At a block 308, the controller 202 and/or the computing device 102 provides, by the communication interface 206, the respective description to the communication device 112.

For example, at the block 306 and the block 308, the controller 202 and/or the computing device 102 may receive (e.g. at the block 306), from the communication device 112, a request for a description of the given item; select (e.g. at the block 306) the given data file 110 based on the request; generate (e.g. at the block 306) the respective description in response to receiving the request; and provide (e.g. at the block 308) the respective description to the communication device in response to receiving the request.

In a particular example, a user of the communication device 112 may operate the communication device 112 to request, from the computing device 102, a description of a given hotel (e.g. a given item). The computing device 102 may generate a respective description of the hotel in response to receiving the request by selecting a given data file 110 associated with the given hotel. For example, a name of the given hotel may be in the request and/or a general location that includes the given hotel may be in the request. As such, the data files 110 may be stored in association with the names of hotels and/or general locations (e.g. such as neighbourhoods and/or cities, and the like) of the hotels, and/or in association with any other suitable information that enables the computing device 102 to determine that a given data file 110 includes information about a hotel that matches search criteria in the request.

Regardless of how the given data file 110 is located and/or determined, the controller 202 and/or the computing device 102 may select a textual template generated at the block 304 and populate the corresponding tags in a textual template, of the one or more textual templates, with corresponding words of the given data file 110 to generate a respective description of the hotel, and provide (e.g. at the block 308) the respective description to the communication device 112.

In some examples, however, respective descriptions for given items represented by the data files 110 may be prepopulated with corresponding words of respective data files 110, and stored at the memory 106 for retrieval when a request is received.

Yet further features are within the scope of the method 300.

For example, prior to providing the respective description to the communication device 112, the controller 202 and/or the computing device 102 may translate the respective description from a first language into a second language selected based on one or more of: a location of the communication device 112; and an indication of the second language as received from the communication device 112. For example, the request from the communication device 112, described above, may be in a particular language and/or metadata of the request may include an indication of the particular language, which is different from the language of the one or more textual templates and/or the data files 110; as such, the controller 202 and/or the computing device 102 may translate the description generated at the block 306 into the particular language.

Similarly, metadata received with the request may indicate a location of the communication device 112, which may be associated with a particular language, and/or the profile 114 may indicate the location of the communication device 112 and/or the profile 114 may indicate the particular language; as such, the controller 202 and/or the computing device 102 may translate the description generated at the block 306 into the particular language. For example, when the communication device 112 is located in France, the controller 202 and/or the computing device 102 may translate the respective description from a first language, such as English, into a second language, such as French.

Furthermore, at the block 304, the controller 202 and/or the computing device 102 may generate an initial larger set of a plurality of the textual templates; generate an efficacy metric for each of the plurality of the textual templates of the larger set; and select a subset of the initial larger set of the plurality of the textual templates as one or more final textual templates based on the efficacy metric. Then, at the block 306, the controller 202 and/or the computing device 102 may select the textual template, for which the corresponding tags are populated, from the one or more final textual templates.

In particular, an efficacy metric may rate textual templates for efficacy of language in a textual template, with a relatively higher efficacy metric indicating higher (e.g. and thus better) efficacy, and a relatively lower efficacy metric indicating lower (e.g. and thus poorer) efficacy. Furthermore, one or more of the machine learning engines 104, such as the template generation engine 104-2, may be trained to determine an efficacy metric for textual templates.

As such, in some of these examples, an initial larger set of a plurality of the textual templates may be generated, and a subset of the plurality of the textual templates having an efficacy metric over a threshold efficacy metric may be selected as one or more final textual templates from which the textual template of the block 306 is selected. In some of these examples, the plurality of the textual templates may be assigned respective efficacy metrics on a scale of 0-100, and a threshold efficacy metric may be "80"; as such, textual templates having an efficacy metric over "80" may be selected as one or more final textual templates, and textual templates having an efficacy metric less than "80" may be discarded.

Similarly, in some of these examples, an initial larger set of a plurality of the textual templates may be generated, and a given number of the plurality of the textual templates having a relatively highest efficacy may be selected as one or more final textual templates from which the textual template of the block 306 is selected. In some of these examples, one thousand textual templates may be generated and assigned respective efficacy metrics on a scale of 0-100; the one hundred (e.g. the given number may be 100, or a percentage of the initial textual templates and the like) of the textual templates that have the highest efficacy metrics may be selected as the final textual templates, and the remaining textual templates may be discarded. Alternatively, the textual template having the highest efficacy metric may be selected as a final textual template, and the remaining textual templates may be discarded.

However, other types of metrics are within the scope of the present specification.

For example, at the block 304, the controller 202 and/or the computing device 102 may generate an initial larger set of a plurality of the textual templates; generate a perplexity metric for each of the plurality of the textual templates of the larger set; and select a subset of the initial larger set of the plurality of the textual templates as one or more final textual templates based on the perplexity metric. Then, at the block 306, the controller 202 and/or the computing device 102 may select the textual template, for which the corresponding tags are populated, from the one or more final textual templates.

In particular, a perplexity metric may rate textual templates for perplexity of language in a textual template, with a relatively higher perplexity metric indicating higher (e.g. and thus poorer) perplexity, and a relatively lower perplexity metric indicating lower (e.g. and thus better) perplexity. Furthermore, one or more of the machine learning engines 104, such as the template generation engine 104-2, may be trained to determine a perplexity metric for textual templates.

As such, in some of these examples, an initial larger set of a plurality of the textual templates may be generated, and a subset of the plurality of the textual templates having a perplexity metric under a threshold perplexity metric may be selected as one or more final textual templates from which the textual template of the block 306 is selected. In some of these examples, the textual templates may be assigned respective perplexity metrics on a scale of 0-100, and a threshold perplexity metric may be "20"; as such, one or more textual templates having a perplexity metric under "82" may be selected as one or more final textual templates, and textual templates having a perplexity metric over than "20" may be discarded.

Similarly, in some of these examples, an initial larger set of a plurality of the textual templates may be generated, and a given number of the plurality of the textual templates having a relatively lower perplexity may be selected as one or more final textual templates from which the textual template of the block 306 is selected. In some of these examples, one thousand textual templates may be generated and assigned respective perplexity metrics on a scale of 0-100; the one hundred (e.g. the given number may be 100, or a percentage of the initial textual templates and the like) of the textual templates that have the lowest perplexity metrics may be selected as the final textual templates, and the remaining textual templates may be discarded. Alternatively, the textual template having the lowest perplexity metrics may be selected as the final textual template, and the remaining textual templates may be discarded.

Put another way, the one or more final textual templates may comprise a given number of the initial larger set of the textual templates having lowest respective perplexity metrics, and the textual template, for which the corresponding tags are populated, may be selected from the one or more final textual templates.

Furthermore, training of the template generation engine 104-2 may be occur using such metrics. For example, efficacy and/or perplexity metrics may be generated for the one or more textual templates, as described herein, and used as feedback in training of template generation engine 104-2. For example, a textual template with an efficacy metric below a threshold efficacy metric may be used to teach the template generation engine 104-2 that such textual templates are an unacceptable output, whereas a textual template with an efficacy metric above a threshold efficacy metric may be used to teach the template generation engine 104-2 that such textual templates are an acceptable output. Similarly, a textual template with a perplexity metric below a threshold perplexity metric may be used to teach the template generation engine 104-2 that such textual templates are an acceptable output, whereas a textual template with a perplexity metric above a threshold perplexity metric may be used to teach the template generation engine 104-2 that such textual templates are an unacceptable output. Hence, as more textual templates are generated and metrics therefor are determined, output from the template generation engine 104-2 may improve (e.g. the template generation engine 104-2 may generate more textual templates with efficacy metrics above a threshold efficacy metric, and fewer textual templates with efficacy metrics below the threshold efficacy metric, and/or the template generation engine 104-2 may generate more textual templates with perplexity metrics below a threshold perplexity metric, and fewer textual templates with perplexity metrics above the threshold perplexity metric, and the like).

Furthermore, in some examples, at the block 304, the controller 202 and/or the computing device 102 may generate an initial larger set of a plurality of the textual templates, as described above, and perform a deduplication process to discard a portion of the initial larger set of the plurality of the textual templates. Put another way, a deduplication process may compare textual templates for similarities and discard textual templates that are similar to another textual template. One or more of the machine learning engines 104, such as the template generation engine 104-2, may be trained to perform such a deduplication process.

Furthermore, such a deduplication process may be score based. For example, one textual template may be selected, and the other textual templates may be compared to the one textual template, and assigned respective similarly scores (e.g. on a scale of 0-100), and the like, with a relatively higher similarity score indicating that a textual template is similar to the one textual template, and a relatively lower similarity score indicating that a textual template is not similar to the one textual template. Using a threshold similarity score (e.g. such as "20"), the textual templates having a similarity score greater than the threshold similarity score may be discarded, and one or more textual templates having a similarity score less than the threshold similarity score may not be discarded. A next textual template (e.g. of the remaining textual templates) may be selected and the process repeated, until one or more final textual templates remain that are not similar and/or not duplicates of each other. As such, the textual template selected at the block 306 may be selected from such one or more final textual templates.

Furthermore any suitable combination of deduplication, efficacy scores and perplexity scores may be used to generate one or more final textual templates from which a textual template is selected at the block 306.

In some examples, at the block 306, the controller 202 and/or the computing device 102 may randomly select a textual template from the one or more textual templates generated at the block 304 (e.g. and/or the controller 202 and/or the computing device 102 may randomly select a textual template from one or more final textual templates generated at the block 304 selected using deduplication and/or efficacy scores and/or perplexity scores).

However, in other examples, the method 300 may further include the controller 202 and/or the computing device 102: accessing one or more of a profile 114, 115 and text information on one or more of the given topic and the given item; and selecting the textual template from the one or more textual templates (e.g. at the block 306) based on one or more of the profile 114, 115 and the text information. For example, as described above, the profiles 114, 115 and/or on-line reviews of trips and/or hotels (e.g. the aforementioned text information on the given topic), and the like, accessible to the controller 202 and/or the computing device 102, may indicate that a user of the communication device 112 generally travels for leisure or business and/or a request for a description of a hotel from the communication device 112 may indicate that the request is for leisure or business such that an associated profile 115 may be selected. As such, when the user of the communication device 112 generally travels for leisure, and/or the request indicates that the description is for leisure travel, a textual template may be selected that includes relatively more tags associated with leisure amenities than business amenities. Conversely, when the user of the communication device 112 generally travels for business, and/or the request indicates that the description is for business, a textual template may be selected that includes relatively more tags associated with business amenities than leisure amenities. Such a decision may be based on a ratio of a first number of tags in a textual templated associated with business amenities to a second number of tags associated with leisure amenities, for example, and/or in any other suitable manner. Furthermore, the profile 114 (e.g. and/or another set of data, which may be received with a request from the communication device 112) may store on-line user names for the user of the communication device 112 which may be used to search given websites for on-line reviews, to determine preferences for the user of the communication device 112. Such functionality may be implemented via the template population engine 104-3. Similarly, a request from the communication device 112 may indicate a type of travel, and the like that may occur in conjunction with requesting a description of a given item and/or hotel, and a profile 115 may be selected accordingly, and/or on-line reviews of the given topic (e.g. hotels) and/or a given item may be accessed that were posted by users associated with the type of travel indicated in the request.

Similarly, in other examples, the method 300 may further include the controller 202 and/or the computing device 102: accessing one or more of the profiles 114, 115 and text information on one or more of the given topic and the given item (e.g. as described above); and selecting the corresponding words from the given data file 110 to populate the corresponding tags in the textual template, to generate the respective description, based on one or more of the profiles 114, 115 and the text information. Hence, as has been previously described, a user preference (e.g. and/or preferences of other leisure travelers) for visiting museums over amusement parks may be used to populate location tags with information related to museums. Such functionality may be implemented via the template population engine 104-3.

In further examples, the method 300 may further include the controller 202 and/or the computing device 102, when a given corresponding tag of the textual template does not correspond to words in the given data file 110, deleting respective words of the textual template associated with the given corresponding tag. Hence, for example, when the textual template selected at the block 306 includes a tag for a business amenity (e.g. such as a business center) and the given data file 110 (e.g. for a hotel) does not include words that describe a business amenity, the respective words of the textual template associated with the given corresponding tag may be deleted. Such functionality may be implemented via the template population engine 104-3.

Furthermore, it is understood that, as previously described, the provided text files 108 may comprise human-generated text files; and the given data file 110 (e.g. of the block 306) may comprise one or more of: an XML file; and corresponding words stored in association with respective tags (e.g. see FIG. 7 for an example of an XML file and corresponding words stored in association with respective tags). From at least the foregoing discussion of the method 300, it is further understood that the respective description (e.g. of the block 306) comprises a computer-generated file.

Figure 4:
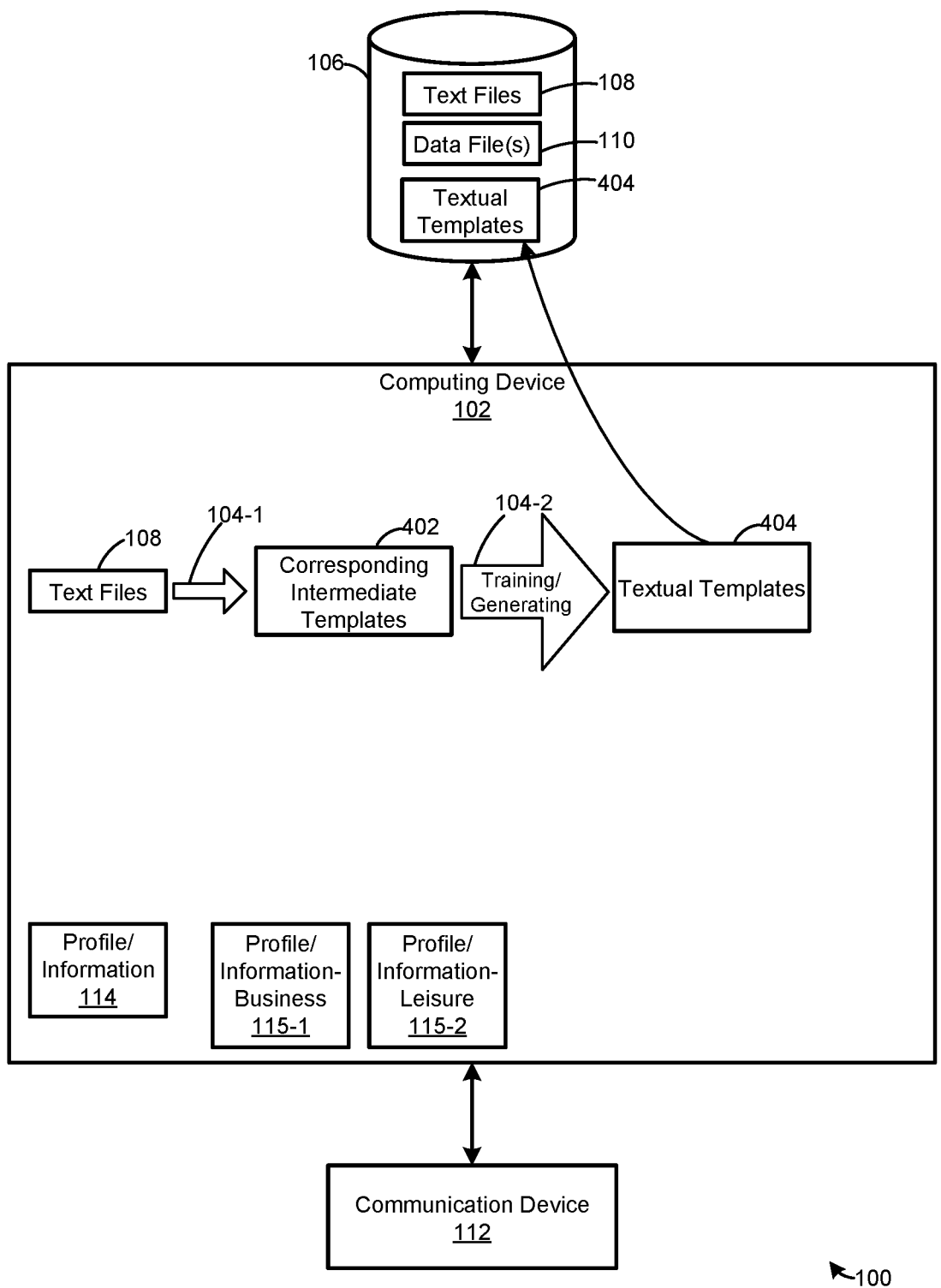
FIG. 4 depicts the system of FIG. 1 implementing a method for providing descriptions to communication devices using machine learning generated templates, according to non-limiting examples.
Figure 5:
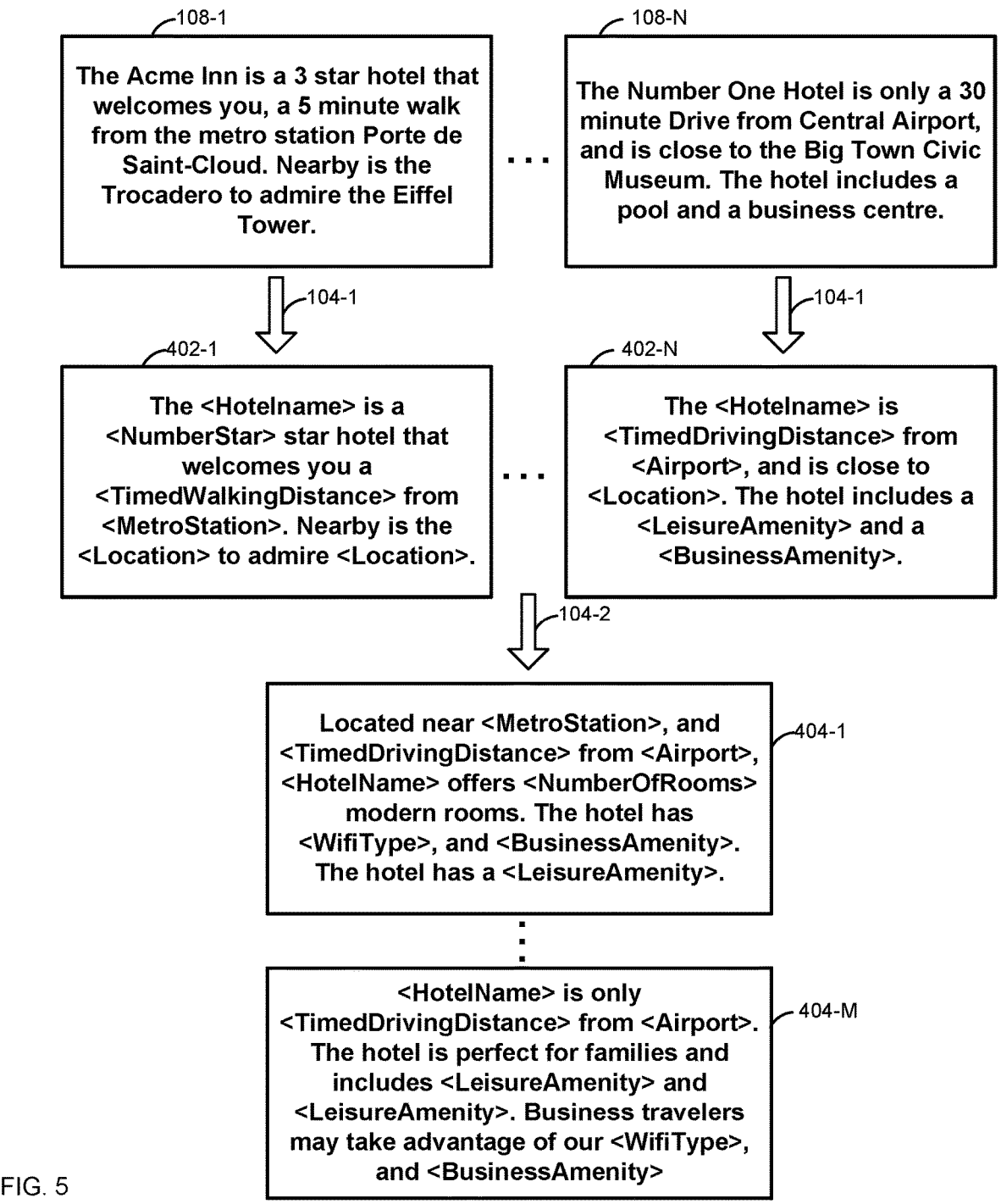
FIG. 5 depicts an example of generating intermediate templates and textual templates, according to non-limiting examples.
Figure 6:
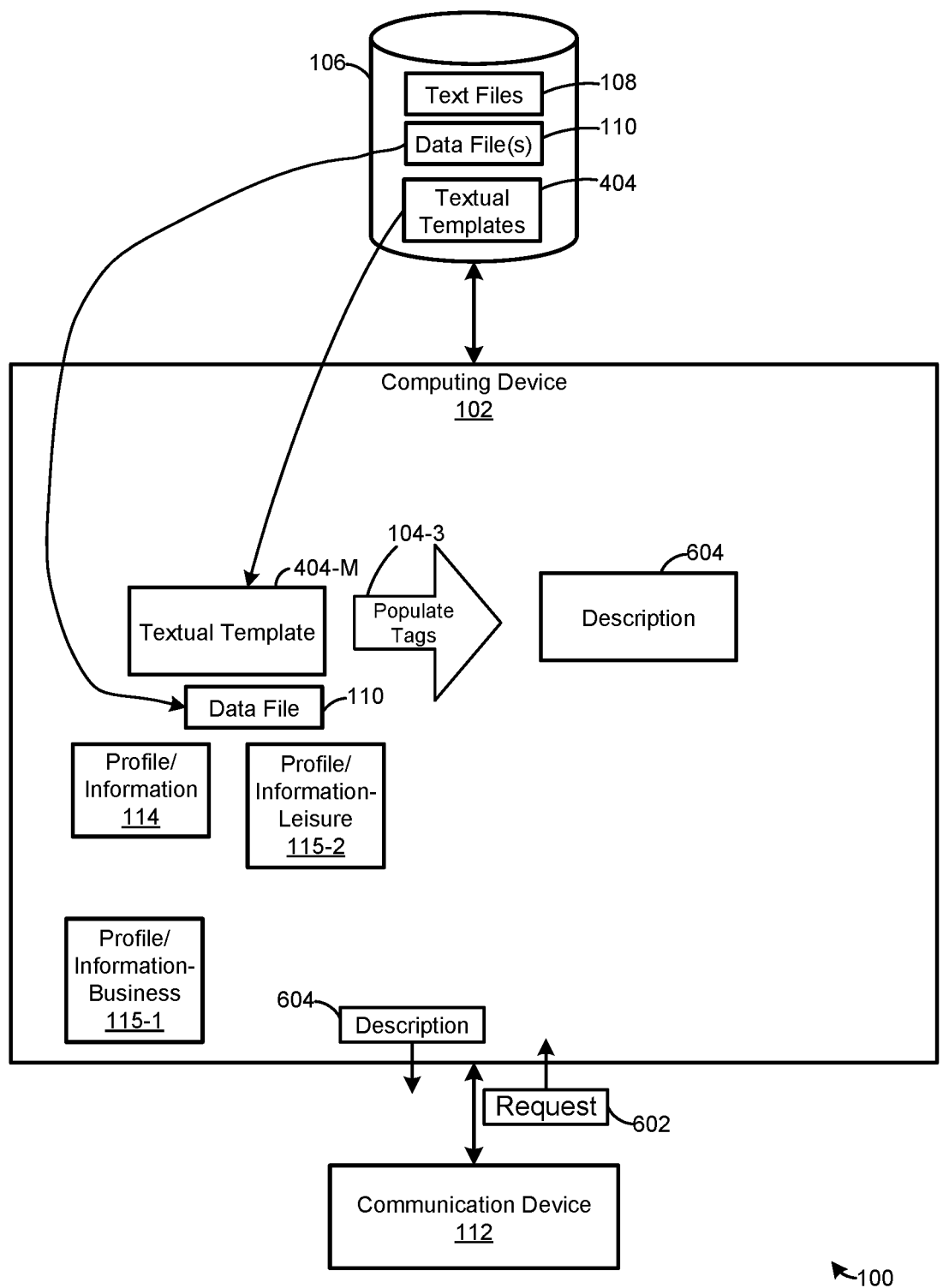
FIG. 6 depicts the system of FIG. 1 continuing to implement a method for providing descriptions to communication devices using machine learning generated templates, according to non-limiting examples.

Attention is next directed to FIG. 4, FIG. 5, FIG. 6 and FIG. 7 which shows an example of the method 300. FIG. 4 and FIG. 6 are substantially similar to FIG. 1 with like components having like numbers. While for simplicity not all components of FIG. 1 are depicted in FIG. 4 and FIG. 6, such components are nonetheless understood to be present. Furthermore, while the examples of FIG. 4, FIG. 5, FIG. 6 and FIG. 7 are described with reference to generation of a plurality of textual templates (e.g. textual templates 404), it is understood that the examples of FIG. 4, FIG. 5, FIG. 6 and FIG. 7 may alternatively be modified to include generation of as few as one textual template (e.g. one textual template 404).

Attention is first directed to FIG. 4 which depicts the computing device 102 generating (e.g. at the block 302 of the method 300) corresponding intermediate templates 402 by replacing (e.g. also at the block 302) given word types in the provided text tiles 108, for example using the tagging engine 104-1.

FIG. 4 further depicts the computing device 102 generating (e.g. at the block 304 of the method 300) textual templates 404 at least partially based on the corresponding intermediate templates 402, for example using the template generation engine 104-2. As depicted, the corresponding intermediate templates 402 may initially be used to train the template generation engine 104-2 to generate textual templates 404, and, once trained, the template generation engine 104-2 may generate the textual templates 404. Hence, in particular, the textual templates 404 are understood to comprise machine learning generated templates.

Furthermore, training of the template generation engine 104-2 may be ongoing and/or performed in conjunction with generation of the textual templates 404. For example, while not depicted, various metrics may be generated for the textual templates 404, as described herein, and used as feedback in the training process. For example, a textual template 404 with an efficacy metric below a threshold efficacy metric may be used to teach the template generation engine 104-2 that such textual templates 404 are an unacceptable output, whereas a textual template 404 with an efficacy metric above a threshold efficacy metric may be used to teach the template generation engine 104-2 that such textual templates 404 are an acceptable output. Similarly, a textual template 404 with a perplexity metric below a threshold perplexity metric may be used to teach the template generation engine 104-2 that such textual templates 404 are an acceptable output, whereas a textual template 404 with a perplexity metric above a threshold perplexity metric may be used to teach the template generation engine 104-2 that such textual templates 404 are an unacceptable output. Hence, as more textual templates 404 are generated and metrics therefor are determined, output from the template generation engine 104-2 may improve (e.g. the template generation engine 104-2 may generate more textual templates 404 with efficacy metrics above a threshold efficacy metric, and fewer textual templates 404 with efficacy metrics below the threshold efficacy metric, and/or the template generation engine 104-2 may generate more textual templates 404 with perplexity metrics below a threshold perplexity metric, and fewer textual templates 404 with perplexity metrics above the threshold perplexity metric, and the like).

While not depicted, deduplication of the textual templates 404 may also occur. Similarly, while not depicted, discarding of textual templates 404 based on efficacy metrics and/or perplexity metrics may also occur.

As depicted, the textual templates 404 (e.g. that are not discarded) are stored at the memory 106. Put another way, the textual templates 404 that are stored at the memory 106 may comprise final textual templates 404 that remain after deduplication and/or discarding based on efficacy metrics and/or perplexity metrics.

Attention is next directed to FIG. 5 which depicts examples of generation of the corresponding intermediate templates 402 using an "N" number of the provided text files 108 using the tagging engine 104-1, as well as generation of an "M" number of the textual templates 404 using template generation engine 104-2. While not depicted, the examples of FIG. 5 are understood to be implemented by the computing device 102.

The numbers "N" and "M" may be the same or different; put another way, there is not necessarily a one-to-one correspondence between an "N" number of the provided text files 108 and an "M" number of the textual templates 404. Furthermore, the number "M" of the textual templates 404 that are generated may be a preconfigured number at the template generation engine 104-2, and/or any other suitable number. The number "N" of the provided text files 108 corresponds to however many text files 108 are available at the memory 106, however "N" may be as large a number as possible (e.g. in the hundreds, thousands, and the like), to improve generation of the textual templates 404 using template generation engine 104-2; put another way, as the number "N" of the provided text files 108 increases, training of the template generation engine 104-2 in generation of the textual templates 404 may improve.

As depicted, the tagging engine 104-1 replaces various given words in the provided text files 108-1 . . . 108-N with corresponding tags to generate the corresponding intermediate templates 402-1 . . . 402-N (e.g. in a one-to-one relationship). For example, as has already been described, in the corresponding intermediate templates 402, hotel names are replaced with a tag <HotelName>, a number of stars is replaced with the tag <NumberStar>, timed walking distances are replaced with a tag <TimedWalkingDistance>, metro station names are replaced with a tag <MetroStation>. Furthermore, various locations are replaced with a tag <Location>, timed driving distances are replaced with a tag <TimedDrivingDistance>, airport names are replaced with a tag <Airport>, leisure amenities are replaced with a tag <LeisureAmenity>, and business amenities are replaced with a tag <BusinessAmenity>. While specific examples of given words and tags are depicted, other types of given words may be replaced with other types of tags; for example, a type of WiFi service offered (e.g. "free WiFi", and/or "unlimited WiFi", and the like) may be replaced with a tag <WiFiType>. Similarly, while not <HotelAddress> tag is depicted, such a tag may be used when an address of a hotel is in a provided text file 108.

As also depicted in FIG. 5, examples of the "M" textual templates 404-1 . . . 104-M, as generated by the template generation engine 104-2 using the corresponding intermediate templates 402 as a training body of data, are also depicted. For example, each of the depicted textual templates 404 includes tags of the corresponding intermediate templates 402 in various combinations, and in natural language sentences. As depicted, the textual templates 404 are arranged to include a parent sentence, such as (e.g. in the textual template 404-1) "Located near <MetroStation>, and (TimedDrivingDistance> from <Airport>, <HotelName> offers <NumberOfRooms> modern rooms" describing general features of a hotel, and separate child sentences that include respective tags associated with business amenities and leisure amenities, such as "The hotel has <WifiType>, and <BusinessAmenity>." and "The hotel has <LeisureAmenity>.", which may be in a DOM structure, and the like.

Furthermore, comparing the depicted textual templates 404 with the depicted provided text files 108, it is apparent that sentences of the textual templates 404 and the provided text files 108 may be different from each other. It is further apparent that the depicted textual templates 404 are in natural language sentences (e.g. with the tags incorporated therein).

Attention is next directed to FIG. 6 which depicts the computing device 102 receiving a request 602 from the communication device 112, for example for a description of given hotel and/or search criteria for hotels. For the example, the request 602 may be to search for a certain type of hotel (e.g. such as a "family" or "business" hotel") in a certain location (e.g. such as city, and the like). The request 602 alternatively indicate that a certain type of travel that may occur, such as leisure travel. As depicted, the computing device 102 retrieves, from the memory 106, a data file 110 that corresponds to the information in the request 602 (e.g. in a database search and/or lookup). For example, the data file 110 depicted in FIG. 6 may comprise an XML file for a hotel that corresponds to the information in the request 602

Similarly, the computing device 102 retrieves, from the memory 106, the textual template 404-M from the memory 106. For example, the textual template 404-M may be retrieved based on information stored in the profile 114 and/or a profile 115. In particular, the profile 114 may indicate that the user of the communication device 112 has a family and more hotel bookings made by the user of the communication device 112 are for leisure travel with their family than for business travel. As such, the computing device 102 may retrieve the textual template 404-M as the textual template 404-M includes more <LeisureAmenity> tags than the textual template 404-1 and further includes the word "families". Similarly, assuming the request 602 indicates leisure travel, and/or the profile 114 of the user of the communication device 112 indicates the user usually travels for leisure, the profile 115-2 be selected and may indicate leisure amenities that other leisure travelers have mentioned in reviews of the given hotel of the request 602, and/or other leisure related reviews of other hotels; the computing device 102 may retrieve the textual template 404-M as the textual template 404-M includes more <LeisureAmenity> tags than the textual template 404-1 and/or may include words mentioned in such reviews, and/or tags associated with words mentioned in such reviews.

In general, retrieval of the textual template 404-M and the data file 110 may occur via the template selection/population engine 104-3, which further populates (e.g. at the block 306 of the method 300) tags of the textual template 404-M with corresponding words from the data file 110 (e.g. see FIG. 7, described below) to generate a description 604 of the hotel associated with the data file 110. The description 604 is provided (e.g. at the block 308 of the method 300) back to the communication device 112, where the description 604 may be provided at a display screen, and the like, and/or using any other suitable output device (e.g. such a speaker at which text from the description 604 may be "played").

Attention is next directed to FIG. 7 which depicts an example of generation of the description 604 from a data file 110 in an XML format, and the textual template 404-M using the template selection/population engine 104-3. While not depicted, the example of FIG. 7 is understood to be implemented by the computing device 102.

In particular, the depicted data file 110 includes data associated with a hotel and includes various fields and/or tagged content which may be used, by the template selection/population engine 104-3, to identify words used to populate the tags of the textual template 404-M. For example, the field and/or tag <name> may identify a name of the hotel (e.g. "BIG LOUD HOTEL"). While fields and/or tags for an address, a country and a category of the hotel of the data file 110 may not be used to populate the tags of the textual template 404-M, such data may be used to in a database search and/or lookup process. For example, the request 602 may include search criteria for "family" hotels in "Ibiza", and, as words of the data file 110 in fields and/or tags for a category and/or address of the data file 110 correspond to such words, the data file 110 may be selected by the computing device 102. It is further understood that if the textual template 404-M included a tag <HotelAddress> words of the fields and/or tags for an address of the data file 110 (e.g. "1234 Ibiza Road", "Ibiza", and/or "Spain") may be used to populate the tag <HotelAddress>.

The data file 110 further includes fields and/or tags <Content> that identify various leisure amenities such as a "pool" and a "beach". However, the data file 110 does not mention business amenities. The fields and/or tags <Content> further identify a timed driving distance from an airport (e.g. "10 minute drive from Ibiza Airport").

As such, the template selection/population engine 104-3 may replace the tags <HotelName>, <TimedDrivingDistance>, and <Airport>, in the textual template 404-M, with corresponding words from the data file 110 such as, respectively, "BIG LOUD HOTEL", "10 minute drive" and "Ibiza Airport". Similarly, the template selection/population engine 104-3 may replace the two tags <LeisureAmenity> in the textual template 404-M with corresponding words from the data file 110 such as, "pool" and "beach". However, as the data file 110 does not mention business amenities the tags <WiFiType> and <BusinessAmenity>, the template selection/population engine 104-3 may delete such tags from the textual template 404-M, along with associated words (e.g. a child sentence of the textual template 404-M that includes the tags <WiFiType> and <BusinessAmenity> are deleted). Alternatively, if the data file 110 did mention business amenities, the child sentence that includes the tags <WiFiType> and <BusinessAmenity> may still be deleted as the profile 114 may indicate that the user of the communication device 112 usually travels for leisure and/or the profile 115-2 may be understood to be associated with leisure travel; however, in other examples, such a child sentence may not be deleted and/or a portion of such a child sentence may remain (e.g. as the user of the communication device 112 may still be interested in a WiFi type).

While the example of FIG. 4, FIG. 5, FIG. 6 and FIG. 7 is described with generating the one or more textual templates 404 prior to receiving the request 602, in other examples the corresponding intermediate templates 402 may be stored (e.g. at the memory 106) and the one or more textual templates 404 may be generated (e.g. using the corresponding intermediate templates 402 as stored) upon receiving the request 602. Indeed, in general, the one or more textual templates 404 may be generated at any suitable time.

As should by now be apparent, the operations and functions of the devices described herein are sufficiently complex as to require their implementation on a computer system, and cannot be performed, as a practical matter, in the human mind. In particular, computing devices, and the lie, such as set forth herein are understood as requiring and providing speed and accuracy and complexity management that are not obtainable by human mental steps, in addition to the inherently digital nature of such operations (e.g., a human mind cannot interface directly with, RAM or other digital storage, cannot transmit or receive electronic messages, such as a requests and/or the information exchanged between the devices described herein, among other features and functions set forth herein).

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein can be achieved using a computing apparatus that has access to a code memory (not shown) which stores computer-readable program code for operation of the computing apparatus. The computer-readable program code could be stored on a computer readable storage medium, which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A method comprising:
   replacing, by a computing device, given word types in provided text files with corresponding tags to generate corresponding intermediate templates, the provided text files associated with a given topic, the corresponding tags of the corresponding intermediate templates respective tag names that identify respective given word types that were replaced in the provided text files;
   generating for the given topic, by the computing device, one or more textual templates that include at least a portion of the corresponding tags, including the respective tag names that identify the respective given word types that were replaced in the provided text files, the one or more textual templates in natural language sentences, the generating of the one or more textual templates at least partially based on the corresponding intermediate templates, wherein the corresponding intermediate templates are generated using at least a first machine learning algorithm, and the corresponding intermediate templates are used to train at least a second machine learning algorithm to generate the one or more textual templates;
   replacing, by the computing device, respective tags of the corresponding tags in a textual template, of the one or more textual templates, with corresponding words of a given data file associated with the given topic that correspond to the given word types identified by the respective tag names, to generate a respective description of a given item associated with the given topic, the given data file being specific to the given item;
   providing, by the computing device and a communication interface, the respective description to a communication device; and
   prior to providing the respective description to the communication device, translating the respective description from a first language into a second language selected based on one or more of: a location of the communication device; and an indication of the second language as received from the communication device.

2. The method of claim 1, further comprising:
   generating an initial larger set of a plurality of the textual templates;
   generating an efficacy metric for each of the plurality of the textual templates of the larger set; and
   selecting a subset of the initial larger set of the plurality of the textual templates as one or more final textual templates based on the efficacy metric, the textual template for which the corresponding tags are populated being selected from the one or more final textual templates.

3. The method of claim 1, further comprising:
   generating an initial larger set of a plurality of the textual templates;
   generating a perplexity metric for each of the plurality of the textual templates of the larger set; and
   selecting a subset of the initial larger set of the plurality of the textual templates as one or more final textual templates based on the perplexity metric.

4. The method of claim 1, further comprising:
   randomly selecting the textual template from the one or more textual templates.

5. The method of claim 1, further comprising:
   accessing one or more of a profile and text information on one or more of the given topic and the given item; and
   selecting the textual template from the one or more textual templates based on one or more of the profile and the text information.

6. The method of claim 1, further comprising:
   accessing one or more of a profile associated and text information on one or more the given topic and the given item; and
   selecting the corresponding words from the given data file to populate the corresponding tags in the textual template, to generate the respective description, based on one or more of the profile and the text information.

7. The method of claim 1, further comprising:
   when a given corresponding tag of the textual template does not correspond to words in the given data file, deleting respective words of the textual template associated with the given corresponding tag.

8. The method of claim 1, wherein:
   the provided text files comprise human-generated text files;
   the given data file comprises one or more of: an Extensible Markup Language (XML) file; and the corresponding words stored in association with respective tags; and
   the respective description comprises a computer-generated file.

9. The method of claim 1, further comprising:
   receiving, from the communication device, a request for a description of the given item;
   selecting the given data file based on the request;
   generating the respective description in response to receiving the request; and
   providing the respective description to the communication device in response to receiving the request.

10. A computing device comprising:
    a communication interface; and
    a controller having access to one or more memories storing provided text files associated with a given topic and a given data file associated with the given topic, the controller configured to:
    replace given word types in the provided text files with corresponding tags to generate corresponding intermediate templates, the corresponding tags of the corresponding intermediate templates comprising respective tag names that identify respective given word types that were replaced in the provided text files;

generate, for the given topic, one or more textual templates that include at least a portion of the corresponding tags, including the respective tag names that identify the respective given word types that were replaced in the provided text files, the one or more textual templates being in natural language sentences, generating of the one or more textual templates at least partially based on the corresponding intermediate templates, wherein the corresponding intermediate templates are generated using at least a first machine learning algorithm, and the corresponding intermediate templates are used to train at least a second machine learning algorithm to generate the one or more textual templates;

replace respective tags of the corresponding tags in a textual template, of the one or more textual templates, with corresponding words of the given data file to generate a respective description of a given item associated with the given topic that correspond to the given word types identified by the respective tag names, the given data file being specific to the given item;

provide, by the communication interface, the respective description to a communication device; and prior to providing the respective description to the communication device, translate the respective description from a first language into a second language selected based on one or more of: a location of the communication device; and an indication of the second language as received from the communication device.

11. The device of claim 10, wherein the controller is further configured to:

generate an initial larger set of the one or more textual templates;

generate an efficacy metric for each of the one or more textual templates of the larger set; and select a subset of the initial larger set of the one or more textual templates as one or more final textual templates based on the efficacy metric, the textual template for which the corresponding tags are populated being selected from the one or more final textual templates.

12. The device of claim 10, wherein the controller is further configured to:

generate an initial larger set of the one or more textual templates;

generate a perplexity metric for each of the one or more textual templates of the larger set; and select a subset of the initial larger set of the one or more textual templates as one or more final textual templates based on the perplexity metric.

13. The device of claim 10, wherein the controller is further configured to:

access, at the one or more memories, one or more of a profile and text information on one or more of the given topic and the given item; and select the textual template from the one or more textual templates based on one or more of the profile and the text information.

14. The device of claim 10, wherein the controller is further configured to:

access, at the one or more memories, one or more of a profile and text information on one or more of the given topic and the given item; and select the corresponding words from the given data file to populate the corresponding tags in the textual template, to generate the respective description, based on one or more of the profile and the text information.

15. The device of claim 10, wherein the controller is further configured to:

when a given corresponding tag of the textual template does not correspond to words in the given data file, delete respective words of the textual template associated with the given corresponding tag.

16. The device of claim 10, wherein the controller is further configured to:

receive, from the communication device, a request for a description of the given item;

select the given data file based on the request;

generate the respective description in response to receiving the request; and provide the respective description to the communication device in response to receiving the request.

* * * * *